July 26, 1966 R. WRIGHT 3,262,537
PALLET STOP FOR CONVEYOR
Filed April 20, 1965
2 Sheets-Sheet 2
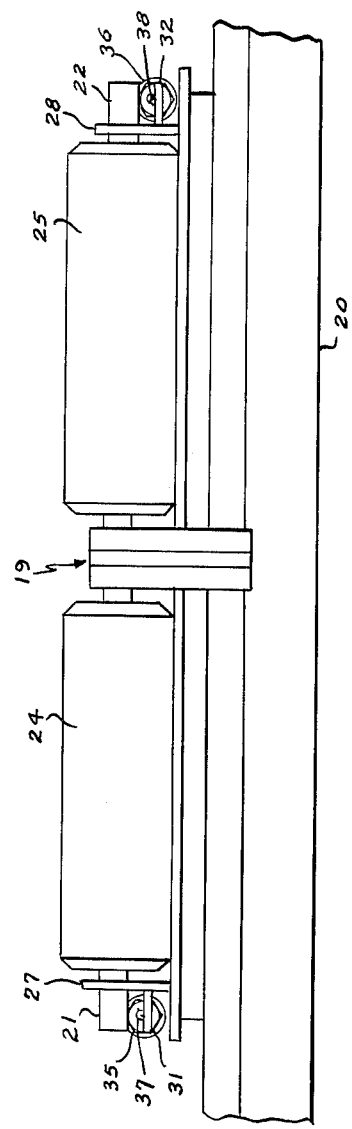
INVENTOR.
ROBERT WRIGHT
BY Harry A. Herbert Jr
ATTORNEY
Richard J Killoren
AGENT

United States Patent Office 3,262,537
Patented July 26, 1966

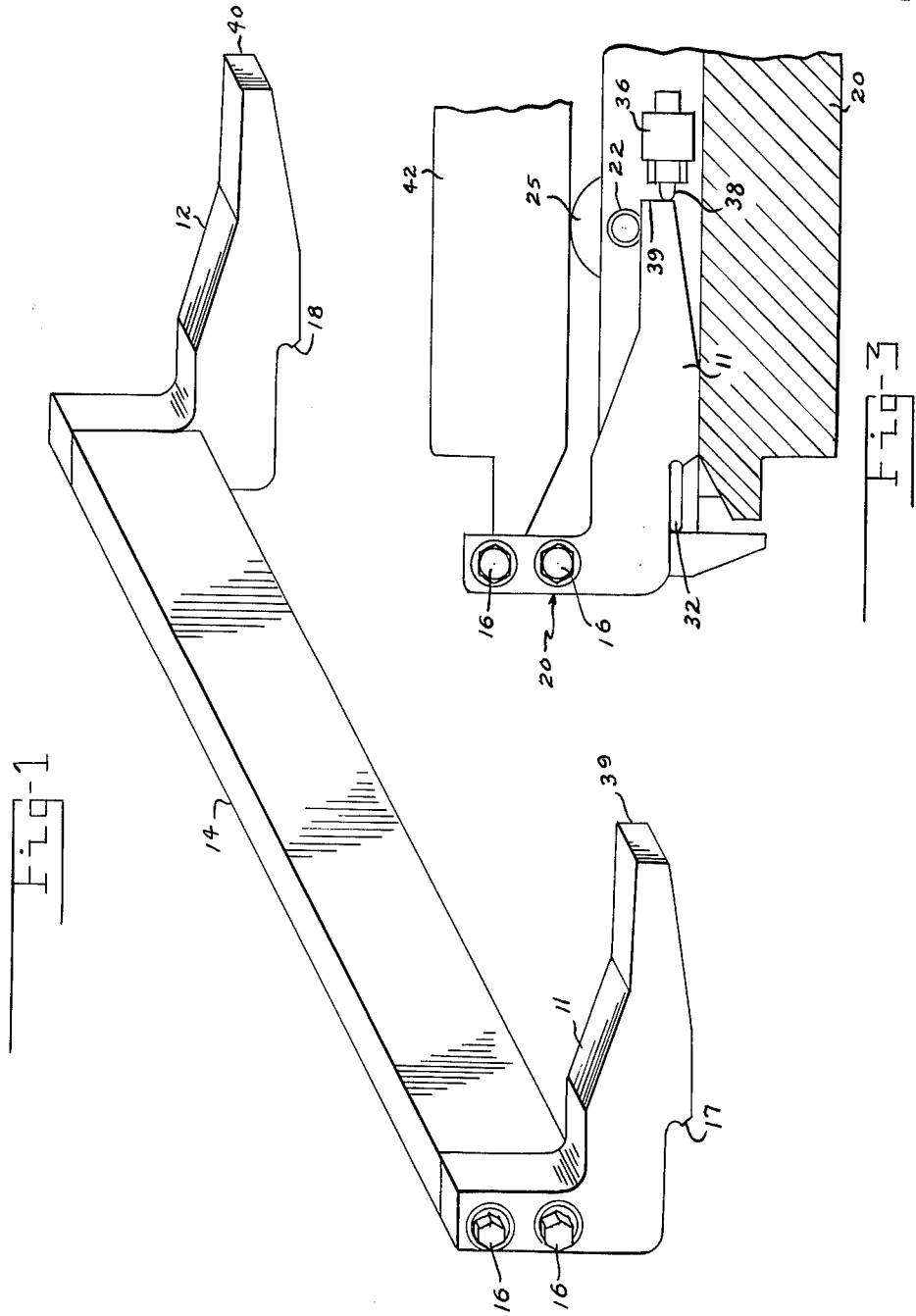

3,262,537
PALLET STOP FOR CONVEYOR
Robert Wright, Trumbull, Conn., assignor to the United States of America as represented by the Secretary of the Air Force
Filed Apr. 20, 1965, Ser. No. 449,660
2 Claims. (Cl. 193—35)

This invention relates to a pallet stop to be used at the end of a roller conveyor.

One object of the invention is to provide a pallet stop attachment for a conveyor which is light in weight and easy to handle and, which can withstand high loads.

Another object of the invention is to provide a pallet stop for heavy loads in which the pallet stop attachment is easy to lock in place on the conveyor.

These and other objects will be more fully understood from the following detailed description taken with the drawing, wherein:

FIG. 1 is an isomeric view of a pallet stop attachment according to the invention;

FIG. 2 shows a cutaway view of a roller conveyor showing the modifications to adapt it for use with the pallet stop attachment of FIG. 1; and, FIG. 3 is a side view of a cutaway portion of the modified roller conveyor with the pallet stop attachment in place.

When truck dollies are loaded with heavy palletized cargo, pallet stops are needed which are easy to remove for the loading and unloading operations. However, the pallet stops must be able to withstand heavy loads in excess of 10,000 pounds. The pallet stop of this invention satisfies these requirements.

Reference is now made to FIG. 1 of the drawing which shows a pallet stop attachment 10, having a pair of pallet stop locking members 11 and 12 and a tie bar 14. The locking members 11 and 12 are secured to the tie bar 14 by means of bolts 16. The locking members 11 and 12 have hook portions 17 and 18, respectively, for engaging shear blocks on the conveyor.

The roller conveyor 19 in FIG. 2, secured to the truck dolly bed 20 in the usual manner, has the shafts 21 and 22 for the rollers 24 and 25 extending beyond the channel roller support members 27 and 28, respectively, so that the stop locking members 11 and 12 can be inserted under the shafts 21 and 22 as shown in FIG. 3. A pair of shear blocks 31 and 32 are secured to the channel roller support members 27 and 28, respectively, by welding or other well-known means. Spring housings 35 and 36, each with a spring-loaded pin 37 and 38, respectively, are secured to each of the channel roller support members 27 and 28, respectively.

In the operation of the device, the pallet stop attachment 20 has its locking members 11 and 12 inserted under the roller shafts 22 and 21, respectively. The ends 39 and 40 of locking members 11 and 12 abut against spring-loaded pins 38 and 37, respectively, and the pallet stop attachment is pushed forward compressing the springs, not shown. The bottom of the locking members 11 and 12 are then permitted to move down into contact with the truck dolly bed 20. The spring-loaded pins 37 and 38 then urge the hook portions 17 and 18 of the locking members 11 and 12 into engagement with the shear blocks 31 and 32. When the pallet shown schematically at 42 comes into contact with the tie bar 14 the horizontal loads are taken by the shear blocks 31 and 32 and the moment loads are taken by the shear blocks 31 and 32, and the roller shafts 21 and 22 with a portion of the moment load being returned to the pallet through the rollers 24 and 25.

There is thus provided a pallet stop for heavy loads with a pallet lock attachment which is easy to lock in place on the conveyor.

While one specific embodiment has been described in detail, it is obvious that numerous changes may be made without departing from the general principle and scope of the invention.

I claim:

1. In combination with a conveyor for use on a conveyance vehicle wherein said conveyor has: a plurality of rollers supported between elongated channel support members, the rollers at each end of said conveyor having shafts extending beyond the channel support members at each side of said conveyor, a spring member attached to the external surface of the channel members at each side of said conveyor adjacent and below said roller shafts and shear blocks affixed to the external surface of the channel members at each side of said conveyor between said rollers and the ends of said conveyor, a pallet stop attachment, comprising: a tie member having a length substantially equal to the width of said conveyor; a locking member attached to each end of said tie member; means on each of said locking members for engaging said shear blocks; means on each of said locking members for engaging the under side of said shafts; said last-named means including means, for engaging said spring members for holding said shear block engaging means in engagement with said shear blocks.

2. In combination with a conveyor for use on a conveyance vehicle wherein said conveyor has: a plurality of rollers supported between elongated channel support members; the rollers at each end of said conveyor having shafts extending beyond the channel support members on each side of said conveyor; a spring member attached to the external surface of the channel members at each side of said conveyor adjacent and below said roller shafts and shear blocks affixed to the external surface of the channel members at each side of said conveyor between said rollers and the ends of said conveyor, a pallet stop attachment, comprising: a tie member having a length substantially equal to the width of said conveyor; a locking member attached to each end of said tie member; each of said locking members having a hook adapted to engage said shear blocks; a projection on each of said locking members adapted to project under said shafts and into engagement with said spring members whereby said hooks are held in engagement with said shear blocks by said spring members.

References Cited by the Examiner

UNITED STATES PATENTS

| | | | |
|---|---|---|---|
| 2,463,532 | 3/1949 | Griffith | 193—35 |
| 2,638,197 | 5/1953 | Small | 193—35 |
| 3,104,749 | 9/1963 | Sullivan | 193—35 |
| 3,180,472 | 4/1965 | Isacsson | 193—37 |

EVON C. BLUNK, *Primary Examiner.*

A. LEVINE, *Assistant Examiner.*